United States Patent Office 2,750,363
Patented June 12, 1956

2,750,363
DEHYDROABIETYL ALCOHOL DERIVATIVE

Thomas F. Sanderson, Wilmington, Del., assignor to Hercules Powder Company, Wilmington, Del., a corporation of Delaware No Drawing. Application December 13, 1952,
Serial No. 325,902

5 Claims. (Cl. 260—97)

This invention relates to a new diol obtainable from dehydrogenated rosin and, more particularly, to 9-hydroxydehydroabietyl alcohol and its preparation.

In accordance with this invention, it has been found that an ester of 9-oxodehydroabietic acid may be reduced with an alkali metal aluminum hydride, whereby both the oxo and carboxyl groups are reduced, to produce a new dialcohol containing the dehydroabietic acid nucleus; namely, 9-hydroxydehydroabietyl alcohol.

It has further been found that this new diol exists in two stereoisomeric forms of the type known as epimers. In one, named herein as the $\alpha$-epimeride, the hydroxy group in the 9-position has a trans configuration with reference to the methyl group in the 4a-position, and in the other, named herein as the $\beta$-epimeride, the hydroxy group has a cis configuration with reference to the 4a-methyl group. The product produced by reduction of an ester of 9-oxodehydroabietic acid as set forth above is believed to be a mixture of the two epimeric forms of the diol with the $\beta$-epimeride predominating. The pure $\alpha$-epimeride may be prepared by the reduction of an ester of 9$\alpha$-hydroxydehydroabietic acid with an alkali metal aluminum hydride, and the pure $\beta$-epimeride by the corresponding reduction of the 9$\beta$-hydroxydehydroabietate.

The following examples will illustrate the preparation of the new 9$\alpha$- and 9$\beta$-hydroxydehydroabietyl alcohols in accordance with this invention.

Example 1

To a solution of 1.81 parts of lithium aluminum hydride in 250 parts of ethyl ether was added a solution of 10.0 parts of methyl 9-oxodehydroabietate in 50 parts of ethyl ether. The reaction mixture was agitated for 16 hours and then with external ice water cooling, 25 parts of water was slowly added. After the reaction which set in had subsided, 100 parts of a 15% aqueous hydrochloric acid solution was added and the reaction mixture was agitated for 1 hour. The ethereal layer which separated was removed and washed consecutively with dilute hydrochloric acid and water. It was then dried and the ether was removed, whereupon 9.2 parts of a crystalline material was obtained. One crystallization from aqueous alcohol yielded 8.2 parts of the pure 9$\beta$-hydroxydehydroabietyl alcohol. It had a melting point of 156.5°–157.5° C. and a specific rotation of +66.5° (2% solution in ethanol). On analysis it was found to contain 79.62% carbon, 10.16% hydrogen, and 10.9% hydroxyl (Zere.). The calculated values for this diol are 79.45, 9.99, and 11.2, respectively.

Example 2

To a solution of 3.5 parts of lithium aluminum hydride in 250 parts of anhydrous ethyl ether was added 6.56 parts of methyl 9-oxodehydroabietate. After agitating the reaction mixture at room temperature for 48 hours, it was cooled externally with ice water and 25 parts of water was slowly added. When the reaction had subsided, 100 parts of a 15% aqueous sulfuric acid solution was added and the mixture was agitated for 1 hour. The ethereal layer was separated, washed with dilute acid and then with water, dried over sodium sulfate, and finally was evaporated to dryness, whereby there was obtained 6.05 parts of the crystalline 9-hydroxydehydroabietyl alcohol. Analysis by ultraviolet absorption spectrum technique showed that the reduction of the methyl 9-oxodehydroabietate to the 9-hydroxydehydroabietyl alcohol was essentially quantitative.

Example 3

To an agitated solution of 6 parts of lithium aluminum hydride dissolved in 1500 parts of anhydrous ether was slowly added a solution of 12 parts of methyl 9$\alpha$-hydroxydehydroabietate in 200 parts of anhydrous ether. Agitation of the reaction mixture under anhydrous conditions was continued for 18 hours. At the end of this time, 300 parts of water was added to the reaction mixture. The resulting ether phase was then separated, dried with sodium sulfate, and evaporated to dryness, whereby there was obtained 10.97 parts of an oil. Crystallization of this oil from acetone yielded 10.19 parts of a crystalline material having a melting point of 92°–101° C. with decomposition. Further recrystallization of the product failed to alter this melting point. On analysis it was found to contain 76.93% carbon, 9.99% hydrogen, and 10.7% hydroxyl (Zere.). Thus this product, isolated by recrystallization from acetone, contains one molecule of acetone of crystallization.

In accordance with this invention, an important new resin diol may be prepared by reducing an ester of 9-oxodehydroabietic acid or an ester of 9-hydroxydehydroabietic acid with an alkali metal aluminum hydride. While the foregoing examples have demonstrated the preparation of 9-hydroxydehydroabietyl alcohol from methyl 9-oxodehydroabietate and from methyl 9-hydroxydehydroabietate, any other esters of 9-oxodehydroabietic acid or 9-hydroxydehydroabietic acid may be used as the starting material. For example, the ester may be any alkyl or aralkyl ester such as the ethyl, propyl, butyl, benzyl, etc., esters.

The esters of 9-oxodehydroabietic acid from which the new diol of this invention is prepared are obtained by the oxidation of the corresponding ester of dehydroabietic acid. This oxidation may be carried out in a variety of ways, as, for example, oxidizing the ester in the molten phase with an oxygen-containing gas in the presence of a metallic salt or by the oxidation in liquid phase with an oxygen-containing gas in the presence of a free radical oxidation initiator with the subsequent reduction of the 9-hydroperoxydehydroabietate, so produced, to the 9-oxocompound, or by oxidizing the ester in an inert organic solvent with chromic acid.

The metal-catalyzed oxidation of the esters of dehydroabietic acid is generally carried out by passing an oxygen-containing gas through the ester in the molten state in the presence of a metallic compound. The temperature at which the oxidation will be carried out will then be at least that of the melting point of the ester being oxidized. In general, the temperature of the oxidation will be from above the melting point of the ester to about 25° C., and preferably from between about 65° C. and about 100° C. Any compound of a metal capable of existing in more than one valence state may be used to catalyze the oxidation reaction provided that the metallic compound is at least slightly soluble in the reaction mixture. Suitable metallic compounds are such salts as the chlorides, acetates, naphthenates, resinates, etc., of such metals as cobalt, iron, nickel, mercury, chromium, manganese, etc.

The chromic acid oxidation of the esters of dehydroabietic acid may be carried out by heating a solution of the ester and chromic acid in an inert organic solvent such as acetic acid, propionic acid, tert-butyl alcohol, etc. The temperature at which this oxidation is carried out is usually from about 25° C. to about 100° C., and preferably from about 35° C. to about 80° C.

The oxidate obtained by either of the foregoing methods may be used directly for the preparation of the 9-hydroxydehydroabietyl alcohol, or the ester of the 9-oxodehydroabietic acid may be separated from the oxidate and then used. The 9-oxodehydroabietate may be separated from the oxidate by countercurrent extraction with two immiscible solvents or by chromatographing the reaction mixture on alumina.

As already pointed out, esters of 9-oxodehydroabietic acid may also be prepared by the oxidation of an ester of dehydroabietic acid in liquid phase with oxygen followed by reduction of the hydroperoxide so obtained to the ketone. This oxidation process is carried out by passing an oxygen-containing gas through the ester in the liquid state, that is, either molten or dissolved in an inert solvent. The temperature at which the oxidation is carried out will depend upon the reaction conditions. For example, if it is carried out in the absence of a solvent, the temperature must be at least that of the melting point of the ester being oxidized. If a solution of the ester is used, lower temperatures may be used for the oxidation. In general, the oxidation is carried out at a temperature of from about 60° C. to about 130° C., and preferably from about 65° C. to about 100° C. A free radical oxidation initiator is preferably added, as, for example, a peroxidic compound such as acetyl peroxide, benzoyl peroxide, tert-butyl hydroperoxide, $\alpha,\alpha$-dimethylbenzyl hydroperoxide, etc. The oxidate so obtained and containing the ester of 9-hydroperoxydehydroabietic acid is then subjected to reduction with a metallic reducing agent to produce the 9-oxodehydroabietate. The reduction is most easily carried out by adding a solution of the metallic reducing agent, as, for example, ferrous sulfate, to a solution of the 9-hydroperoxydehydroabietate in an inert solvent, which is preferably one in which ionization is possible, as, for example, aqueous alcohol, acetone, dioxane, etc.

The esters of 9-hydroxydehydroabietic acid may also be obtained by oxidation of the corresponding ester of dehydroabietic acid to the 9-hydroperoxydehydroabietate by reducing the latter compound with a nonmetallic reducing agent in place of the metallic reducing agent used for the preparation of the oxo compound. Any nonmetallic reducing agent may be used to reduce this hydroperoxy compound to the corresponding hydroxy compound. Suitable nonmetallic reducing agents which may be used are preferably water-soluble salts such as the alkali metal, alkaline earth metal, and ammonium salts of nonmetallic reducing anions such as the sulfide, sulfite, bisulfite, iodide, etc., anions.

The esters of 9-hydroxydehydroabietic acid may also be prepared by the reduction of esters of 9-oxodehydroabietic acid by hydrogenation in a neutral solution, such as in ethanol, with a noble metal catalyst such as palladium-on-carbon. However, the product obtained by this process consists chiefly of the $\beta$-epimer of the 9-hydroxydehydroabietate.

The reduction of the esters of 9-oxo- or 9-hydroxydehydroabietates with an alkali metal aluminum hydride in accordance with this invention is generally carried out in solution. Any inert organic solvent may be used as the reaction medium for the reaction provided that it is a solvent for either one or both reactants. Suitable solvents that may be used are diethyl ether, di-n-butyl ether, diethyl Carbitol, dioxane, tetrahydrofuran, N-ethylmorpholine, etc. To avoid decomposition and waste of the alkali metal aluminum hydroxide, the reaction should preferably be carried out under anhydrous conditions. Any alkali metal aluminum hydride such as lithium aluminum hydride, sodium aluminum hydride, etc., may be used but lithium aluminum hydride is usually used because of its greater solubility in organic solvents. For optimum yields the amount of alkali metal aluminum hydride used should be at least the equivalent needed to reduce the ketone and/or ester groups present in the starting material. Thus, for the reduction of esters of 9-oxodehydroabietic acid, there will be needed a total of at least 0.75 mole of alkali metal aluminum hydride per mole of ester for the complete reduction of both the ketone and ester groups to alcohol groups. For the reduction of esters of 9-hydroxydehydroabietic acid, there will be needed at least 0.5 mole of alkali metal aluminum hydride per mole of ester. Usually an excess of the alkali metal aluminum hydride is used and any excess may be used, but an excess in the range of from about 20 to about 50% will be adequate to insure complete reaction. Thus, the amount of alkali metal aluminum hydride will usually be within the range of from about 0.5 to about 1.5 moles per mole of ester. The temperature at which this reduction reaction is carried out is limited only by the boiling point of the solvent that is used as the reaction medium or the temperature at which the alkali metal aluminum hydride decomposes. In general, a temperature within the range of from about $-15°$ C. to about 100° C., and preferably from about 20° C. to about 50° C., will be used.

The alkali metal aluminum complex which is formed as an intermediate in this reaction is then hydrolyzed by the addition of water, an acid, or a base. The examples have demonstrated the use of water, hydrochloric acid, and sulfuric acid. However, any other acid, and preferably any other inorganic acid, may be used, as, for example, phosphoric acid, etc. The concentration of the acid used as the hydrolytic agent is, of course, immaterial inasmuch as water itself may be used to hydrolyze the complex but preferably the acid will have a concentration of from about 5 to about 25%. The hydrolysis readily takes place at room temperature and hence elevated temperatures are not required but may be used if desired.

The method by which the diol is separated from the reaction mixture will, of course, depend upon the type of solvent used for carrying out the reaction. For example, if a water-immiscible solvent is used, the diol will be present in the organic phase and can be separated from that phase by removal of the solvent. The diol may also be separated from the reaction mixture by extraction with a suitable water-immiscible solvent. Since it is a crystalline product, it is readily purified by crystallization procedures.

This new diol, 9-hydroxydehydroabietyl alcohol, the systematic name for which is 1,2,3,4,4a,9,10,10a-octahydro-9-hydroxy-1-hydroxymethyl-7-isopropyl-1,4a - dimethylphenanthrene, is a valuable intermediate for the preparation of synthetic materials. It is of particular importance as an intermediate for the preparation of dehydrodehydroabietyl alcohol, an important unsaturated resin alcohol. For example, 9-hydroxydehydroabietyl alcohol may be acylated by means of an acyl halide such as acetyl chloride, benzoyl chloride, etc. by heating the diol with the acyl halide in an inert solvent at a temperature of from about 0° to about 90° C. The diacylate so produced may then be heated with a reagent such as collidine, pyridine, etc., to produce the 9(10)-dehydro-dehydroabietyl acylate which may then be hydrolyzed to obtain the desired 9(10)-dehydro-dehydroabietyl alcohol.

What I claim and desire to protect by Letters Patent is:

1. 9-hydroxydehydroabietyl alcohol.

2. The process of preparing 9-hydroxydehydroabietyl alcohol which comprises reacting an ester selected from the group consisting of esters of 9-oxodehydroabietic acid and esters of 9-hydroxydehydroabietic acid with an alkali metal aluminum hydride at a temperature of from about $-15°$ C. to about 100° C. and hydrolyzing the complex so obtained.

3. The process of preparing 9-hydroxydehydroabietyl alcohol which comprises reacting an ester selected from the group consisting of esters of 9-oxodehydroabietic acid and esters of 9-hydroxydehydroabietic acid with lithium aluminum hydride at a temperature of from about 20° C. to about 50° C. and hydrolyzing the complex so obtained.

4. The process of preparing 9-hydroxydehydroabietyl alcohol which comprises reacting methyl 9-oxodehydroabietate with lithium aluminum hydride at a temperature of from about 20° C. to about 50° C. and hydrolyzing the complex so obtained.

5. The process of preparing 9-hydroxydehydroabietyl alcohol which comprises reacting methyl 9-hydroxydehydroabietate with lithium aluminum hydride at a temperature of from about 20° C. to about 50° C. and hydrolyzing the complex so obtained.

References Cited in the file of this patent

UNITED STATES PATENTS

| | | |
|---|---|---|
| 2,367,000 | Campbell | Jan. 9, 1945 |
| 2,656,343 | Ritchie | Oct. 20, 1953 |

OTHER REFERENCES

"Org. Reactions," Adams et al., John Wiley and Sons, Inc., N. Y. (1951), vol. VI, pp. 474–78.

"Natural Products Related to Phenanthrene," Fieser et al., 3rd ed., page 68, Reinhold Pub. Co., N. Y. (1949).